May 24, 1932. S. C. FAULK 1,859,358
PEANUT HARVESTER
Filed Sept. 11, 1931
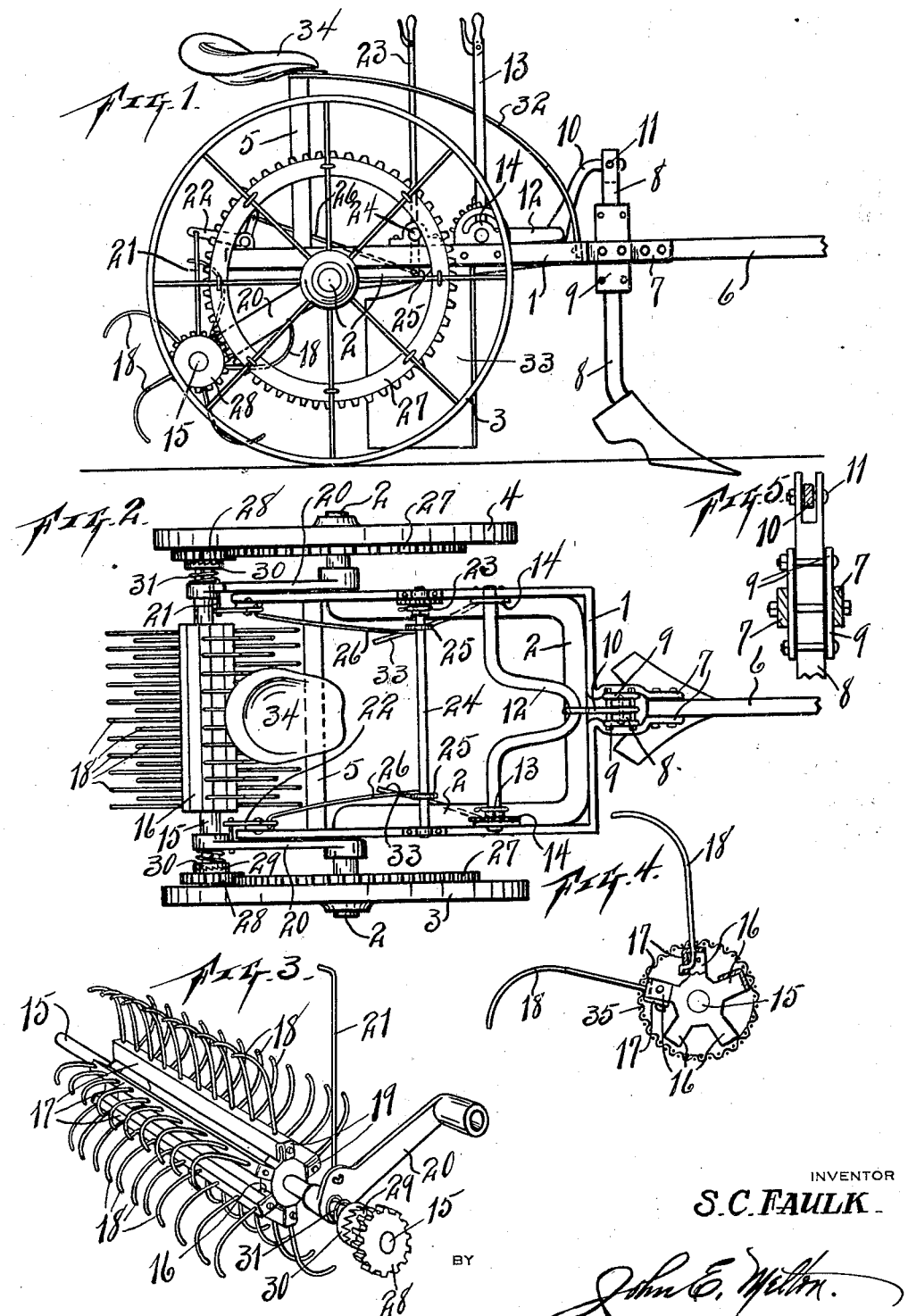
INVENTOR
S. C. FAULK
BY
John E. Wilton
ATTORNEY Patented May 24, 1932

1,859,358

UNITED STATES PATENT OFFICE

SEBASTIAN C. FAULK, OF BURLESON, TEXAS

PEANUT HARVESTER

Application filed September 11, 1931. Serial No. 562,288.

My invention relates to peanut harvesters and more particularly to a machine for harvesting peanuts and the like which is provided with a means for severing the plant from the ground and a means for raising the plant from the ground. The object is to provide a machine in which the plant may be removed from the ground with the least amount of effort. Another object is to provide a machine for this purpose which is inexpensive to manufacture and easily operated. An advantage of this machine is that it is simple in construction and requires only a small amount of attention from the operator. Other objects and advantages will be fully explained in the following description and the invention will be more particularly pointed out in the claims.

Reference is had to the accompanying drawings which form a part of this application.

Fig. 1 is a side elevation of the harvester.

Fig. 2 is a plan view of the same, showing the dust guard omitted.

Fig. 3 is a perspective view, showing in detail, the manner of arranging the teeth and the supporting bars.

Fig. 4 is a detail view, showing how the teeth are attached to the supporting bars.

Fig. 5 is a detail view of the plow beam.

Similar characters of reference are used to indicate the same parts throughout the several views.

This harvester is provided with a wheeled truck having an axle 2 arched horizontally and supported on tractor wheels 3 and 4. A frame 1 is supported on the axle 2 and is provided with an arched or U shaped member 5. A tongue 6 is attached to the frame 1 by means of forward extending portions 7 of the frame. These extensions 7 also serve to adjustably carry the plow beam 8. Brackets 9 are attached to the extensions 7 and the beam 8 is vertically adjustable in these supporting brackets. The beam 8 is elevated and lowered by means of a bent rocker shaft 10 which is pivotally connected to the beam 8 by a bolt 11 and the other end of the shaft 10 is pivotally mounted on the bent portion of a horizontal shaft 12. The shaft 12 is supported on the frame 1 by bearings 14 and is provided with a lever 13. This lever is provided with the usual dog and rack for holding the lever at different adjustments. Movement of the lever 13 gives vertical adjustment of the plow.

When the plow is lowered it will plow up the vine so that it may be picked up. Means are provided for picking up the vine and shaking the dirt out of the vine. A revolving reel is mounted on a shaft 15 which is adjustably positioned between the tractor wheels 3 and 4 and driven thereby. The shaft 15 is journaled in brackets 20 which are attached to the axle 2 and also supported by rods or bars 21 which are attached to the brackets 20 and to crank arms 22. The crank arms 22 are fulcrumed on the rear ends of the frame 2 and are provided with an actuating lever 23. A shaft 24 is journaled in the frame 1 and provided with downwardly projecting arms 25 which are connected to the crank arms 22 by link bars 26. These bars 26 are pivotally connected to the arms 25 and to the crank arms 22. The lever 23 is rigidly attached to the shaft 24 and provided with the usual dog and rack for holding the lever at different adjustments. Movement of the lever 23 will elevate and lower the revolving reel.

The shaft 15 is driven by the wheels 3 and 4. Cog wheels 27 are made rigid with the wheels 3 and 4 and drive pinions 28 which are revolvably mounted on the shaft 15. The pinions 28 are provided with ratchet teeth 29 which mesh with and drive ratchet teeth 30. The ratchet 30 is keyed to the shaft 15 and the shaft is driven thereby. Coil springs 31 are carried by the shaft 15 and positioned between the arms 20 and the ratchet teeth 30 so that the teeth 29 and 30 may be held in mesh. This structure gives a differential action to the movement of the shaft 15 when the harvester is being turned at a corner.

The revolving reel is provided with ribs 16 and the ribs 16 are covered by strips of angle-iron 17. Teeth or bars 18 are attached to the angle-iron 17. These bars project from the reel and are curved at their outer ends as fingers for scooping up and lifting the vines after they have been plowed up. These fingers or bars 18 are journaled to the angle iron strips by bending the bars so as to project through both sides of the angle iron strips 17. The harvester is provided with a dust guard 32 which extends from the front of the frame 1 back to the driver's seat 34 which is carried by the U-shaped member 5. Guide plates 33 are attached to the frame 1 between the plow and the revolving reel and positioned so as to cause the vines to be thrown towards the center of the reel. The ribs 16 of the reel may be covered by a wire mesh so that the vines will not clog between the ribs.

When the plow is set for plowing by the lever 13 and the reel is lowered by means of the lever 23, the harvester will sever the plant from the ground with the plow. The plant will then come into contact with the guides 33 and be directed to the center of the reel. The reel fingers 18 will lift the vine from the ground and turn it completely over before dropping it. This causes the plant to be practically clear of the dirt that might have been hanging to the roots. The throwing of the vine, in this manner, shakes most of the dirt out of the vine.

What I claim, is:

1. In a peanut harvester provided with a frame consisting of wheels and an axle therefor; a plow carried by said frame for severing the vine of the peanut from the ground, a revolving reel carried by said axle and adapted to pick up said vine, guides carried by said frame for directing said vine to said reel, and means for driving said reel.

2. In a peanut harvester provided with a frame consisting of traction wheels and an axle therefor; a plow carried by said frame for severing the peanut vine from the ground, means for elevating and lowering said plow, a reel adapted to pick up said vine, means for elevating and lowering said reel, guides carried by said frame and adapted to direct said vine to said reel, and means for revolving said reel.

3. In a peanut harvester provided with a frame, traction wheels and an axle for said wheels; an adjustable plow carried by said frame for severing the vine of the peanut from the ground, a pick up reel pivotally connected to said axle and positioned in the rear of said plow, means for elevating and lowering said reel, guide means carried by said frame for directing the vine to said reel, and means for revolving said reel.

In testimony whereof, I set my hand, this 22 day of March, 1929.

SEBASTIAN C. FAULK.